US007773121B1

(12) United States Patent
Huntsberger et al.

(10) Patent No.: US 7,773,121 B1
(45) Date of Patent: Aug. 10, 2010

(54) HIGH-RESOLUTION, CONTINUOUS FIELD-OF-VIEW (FOV), NON-ROTATING IMAGING SYSTEM

(75) Inventors: Terrance L. Huntsberger, Altadena, CA (US); Robert C. Stirbl, Pasadena, CA (US); Hrand Aghazarian, La Crescenta, CA (US); Curtis W. Padgett, Los Angeles, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 537 days.

(21) Appl. No.: 11/741,213

(22) Filed: Apr. 27, 2007

Related U.S. Application Data

(60) Provisional application No. 60/797,742, filed on May 3, 2006.

(51) Int. Cl.
*H04N 5/225* (2006.01)
*H04N 7/18* (2006.01)
(52) U.S. Cl. .................... 348/218.1; 348/36; 348/143; 348/373; 348/374
(58) Field of Classification Search .............. 348/218.1
See application file for complete search history.

(56) References Cited

U.S. PATENT DOCUMENTS 6,347,010 B1   2/2002   Chen
7,023,913 B1*  4/2006   Monroe ................. 375/240.01
7,126,630 B1* 10/2006   Lee et al. ................. 348/218.1
7,171,088 B2*  1/2007   Koyama et al. ............. 385/116
7,183,549 B2*  2/2007   Teich et al. ................. 250/330
7,215,364 B2*  5/2007   Wachtel et al. ........... 348/218.1
7,277,118 B2* 10/2007   Foote .......................... 348/36
2004/0041914 A1* 3/2004  Peters, III ............. 348/207.99
2005/0134698 A1* 6/2005  Schroeder et al. ........ 348/218.1
2007/0097206 A1* 5/2007  Houvener et al. ............. 348/26
2009/0290033 A1* 11/2009 Jones et al. .............. 348/218.1

OTHER PUBLICATIONS

Vasiliev et al., Real-Time Smart Optical SAR Signal Processor, Proc. SPIE vol. 3161, p. 193-202, Radar Processing, Technology, and Application II. US Publication date: Sep. 1997.

* cited by examiner

*Primary Examiner*—Ngoc-Yen T Vu
(74) *Attorney, Agent, or Firm*—Mark Homer

(57) ABSTRACT

A high resolution CMOS imaging system especially suitable for use in a periscope head. The imaging system includes a sensor head for scene acquisition, and a control apparatus inclusive of distributed processors and software for device-control, data handling, and display. The sensor head encloses a combination of wide field-of-view CMOS imagers and narrow field-of-view CMOS imagers. Each bank of imagers is controlled by a dedicated processing module in order to handle information flow and image analysis of the outputs of the camera system. The imaging system also includes automated or manually controlled display system and software for providing an interactive graphical user interface (GUI) that displays a full 360-degree field of view and allows the user or automated ATR system to select regions for higher resolution inspection.

13 Claims, 3 Drawing Sheets

HIGH-RESOLUTION, CONTINUOUS FIELD-OF-VIEW (FOV), NON-ROTATING IMAGING SYSTEM

CROSS-REFERENCE TO RELATED APPLICATIONS

The present application derives priority from U.S. Provisional Patent Application No. 60/797,742; Filed May 3, 2006.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

1. Field of the Invention

The present invention relates to electronic imaging systems and, more particularly, to a high resolution CMOS imaging system especially suitable for use in a periscope head that yields a continuous 360-degree field-of-view without mechanical rotation.

2. Description of Prior Art

A periscope "head" is the top portion of a periscope that contains the lenses and mirrors used to observe what is outside certain vehicles, including submarines, armored cars, spacecraft and their rovers.

Conventional periscope systems employ a full length sealed outer casing with an interior rotatable mast, and various observation optics and sensors mounted on the mast. While theses optics used to be lenses, many modern periscopes employ electronic imagers such as charge-coupled devices (CCDs). For example, U.S. Pat. No. 6,347,010 to Chen et al. issued Feb. 12, 2002 shows a a periscope with an IR sensor, visible CCD camera, and a laser range finder.

The instantaneous horizontal field of view (FOV) is defined as the field of view obtained at a single fixed observation point, allowing for rotation of the eye about this point but not the translation of the eye's position. Because periscopes contain an entrance and exit aperture separated optically by some distance, they form an apparent tunnel through which the observer sees. When the instantaneous field of view of a single periscope is limited by the entrance aperture, one or both side walls of the tunnel will be seen by the observer. This is generally the case with conventional periscopes because their exit and entrance apertures are substantially the same size.

Thus, current US Navy periscope sensor heads utilizes CCD technology with a variable X-magnification field-of-view sensor.

Wide-angle coverage has been attempted by arranging a plurality of periscopes side-by-side along an arc. However, since each periscope has a limited field of view and one or both side walls of each periscope will always be visible, these visible side walls will act as visual blockages.

Additionally, whenever multiple imagers are employed the amount of data complicates the issue. Search and detection require wide field-of-view (FOV), tracking requires fast frame-rate data output from regions of interest (ROI), target recognition requires high spatial resolution, and multi-target cueing requires all four of the foregoing. The use of an optical zoom is one way, but an extremely inefficient way of carrying out these diverse tasks because it cannot simultaneously provide narrow and wide field of view scene visualization. It is often difficult for an operator to quickly zoom in and out of the ROI because of the vast changes in the FOV during zooming and relocating contacts within the search FOV (which may be 50× higher magnification).

It would be greatly advantageous to provide an improved high resolution CMOS imaging system especially suitable for use in a periscope head that yields a continuous 360-degree field-of-view without mechanical rotation with electronically selectable, low and high-resolution fields-of-view environment. The foregoing would be well suited for use in a variety of vehicles, and particularly in extraterrestrial rovers (such as the Mars Science Laboratory (MSL) rover under development.

SUMMARY OF THE INVENTION

It is a primary object of this invention to provide an improved high resolution CMOS imaging system especially suitable for use in a periscope head that yields a continuous 360-degree field-of-view without mechanical rotation.

It is another object of the invention to provide a direct viewing system which affords a substantially continuous non-obstructed 360 degree field of view.

It is another object to provide a non-rotating, 360-degree view and automatic- or operator-controlled display of the objects of interest within the sea surface, shore, and sky background from a periscope with continuous observation of theses contacts (potential targets), automatic detection and tracking of contacts, recognition of contacts (threat determination), and the ability to digitally zoom to any area for closer inspection.

In accordance with the foregoing objects, the present invention is a high resolution CMOS imaging system especially suitable for use in a periscope head that yields a continuous 360-degree field-of-view without mechanical rotation. The high resolution CMOS imaging system comprises two major elements: a sensor head for scene acquisition, and a control apparatus inclusive of distributed processors and software for device-control, data handling, and display. The sensor head is a uniquely-configured cylindrical head assembly suitable for use on the existing mast of conventional periscopes inside a full length sealed cylindrical outer casing. The sensor head further comprises multi-camera decks of imaging arrays, and preferably cylindrical decks stacked end-to-end in an elongate cylindrical form. The decks collectively enclose a combination of wide field-of-view CMOS imagers and narrow field-of-view CMOS imagers, to yield an electronically electable, low and high-resolution fields-of-view environment. Each deck of imagers is controlled by a dedicated processing module in order to handle information flow that provides seamless autonomously georectified and stitched or fused scene data set and image analysis of the outputs of the fused camera system. The control apparatus also includes a display system and software for providing an interactive graphical user interface (GUI) that displays a full 360-degree seamless field of view and allows the autonomous system or the user to select regions for higher resolution inspection. The novel periscope head of the present invention can concurrently carry out a number of diverse visual tasks, such as surveillance, vision-based navigation, automatic target recognition (ATR), multi-target cueing applications, search and detection, tracking, etc.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a high resolution CMOS imaging system especially suitable for use in a periscope head that yields an autonomously-stitched and seamlessly-continuous 360-degree field-of-view image with autonomously and/or manually selected magnified subwindow regions of interest, without any mechanical rotation.

Figure 1:
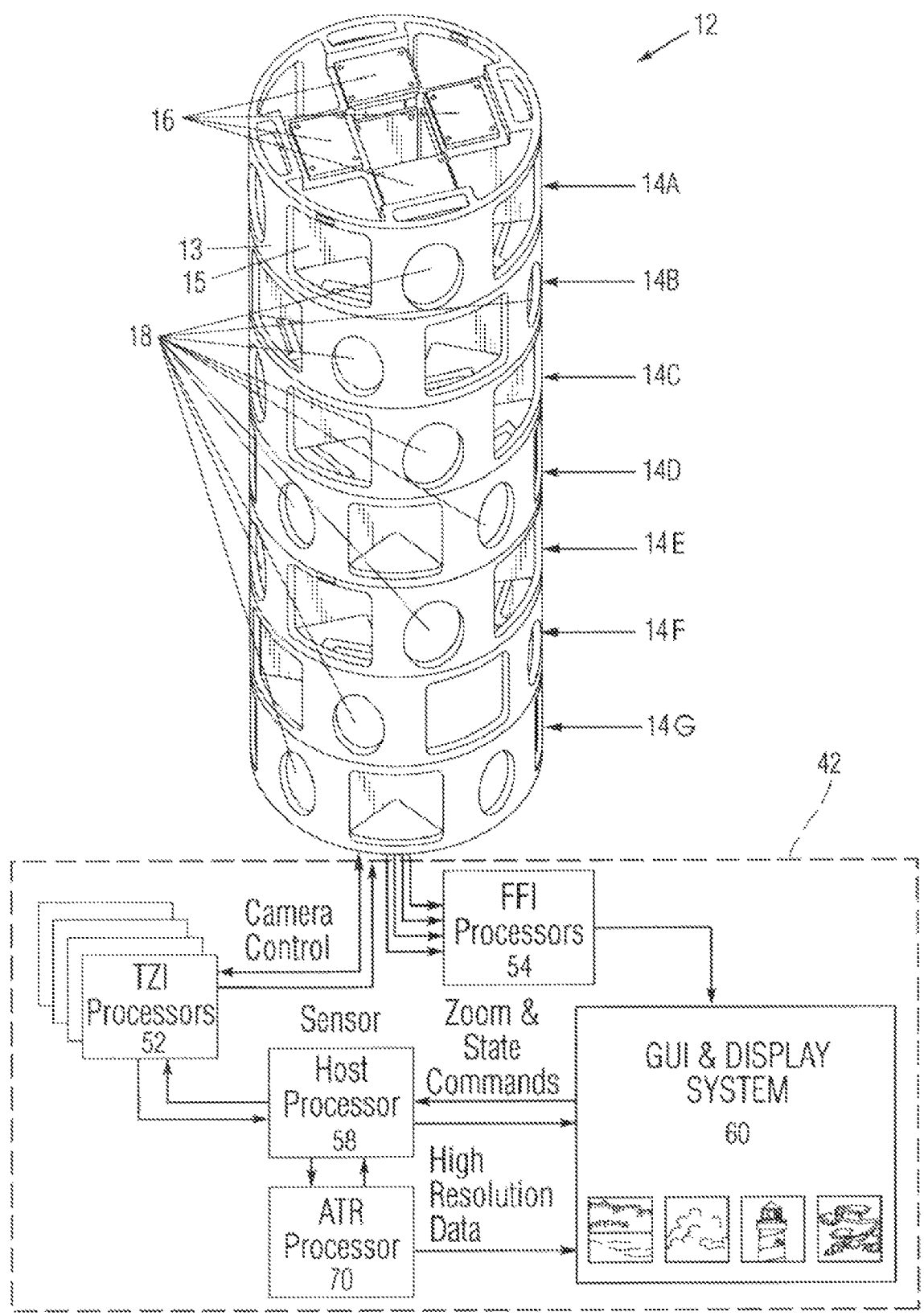
FIG. 1 is a perspective view of the system architecture including major components and data paths.

FIG. 1 is a perspective view of the system architecture including major components and data paths.

The high resolution CMOS imaging system comprises two major components: a sensor head 12 for scene acquisition, and a control apparatus 42 inclusive of distributed processors and software for device-control, data handling, and display.

The sensor head 12 is a uniquely-configured cylindrical head assembly suitable for use on the existing mast of conventional periscopes inside a full length sealed cylindrical outer casing. The sensor head 12 further comprises a multi-deck imaging array with seven (7) cylindrical decks 14A-G stacked end-to-end. Structurally, each deck 14A-G is comprised of a cylindrical outer wall 13 and closed internal partitions 15 forming a honeycomb of compartments for the various imagers therein. The seven decks 14A-G may be welded or otherwise engaged end-to-end.

Specifically, the closed internal partitions 15 of the uppermost deck 14A encloses four (4) wide field-of-view Full-Field Imagers (FFI) 16 arranged back-to-back as shown with 90 degree offset focal paths. The four wide-field Full-Field Imagers (FFI) 16 preferably 92-degree or larger FFI's oriented at 90 degree offsets, and convention CMOS 3100×2100 pixel imagers operating at 20 frames per second are suitable for this purpose.

Each subsequent lower deck 14B-14G houses four (4) narrow field-of-view Tracking Zoom Imagers (TZI). Thus, the lower six (or more) decks 14B-G collectively comprise twenty-four 17 degree (or less) Tracking Zoom Imagers (TZI) 18 oriented at 15 degree (or less) offsets. Again, conventional CMOS 3100×2100 pixel (or alternate resolution) imagers operating at 10-20 (or higher) frames per second are suitable.

In sum, there are a total of four (4) wide field-of-view FFI imagers 16 and at least twenty-four (24) narrow field-of-view TZI imagers 18 in a single sensor head 12. The resulting combination of wide and narrow FOV imagers 16, 18 allows for an electronically selectable, low and high-resolution seamlessly fused field-of-view environment, with 360-degree angular coverage at low resolution and simultaneous 360-degree high-resolution angular coverage.

All of the imagers 16, 18 may be commercial off-the-shelf CMOS imagers (for example, Silicon Imaging, Inc. Mega-Camera SI-6600-M or Rockwell Scientific BTBV-4K), which are commercially available in either wide field-of-view or narrow field-of-view versions. Alternatively, imagers 16, 18 may be specially fabricated Focal Plane Detector Array Imagers.

All four wide field FFI imagers 16 are mounted in the top deck 14A to provide the 360-degree angular coverage (four overlapped 92-degree (or larger) field of view wide-field imagers 16 oriented at 90 degree focal offsets to provide overlapping fields of view), and the twenty-four (or more) narrow field TZI imagers 18 are mounted in six banks of four, in the six (or more) lower decks 14B-G to image the full field in high resolution (collectively using twenty-four (or more) seventeen-degree FOV TZI imagers 18 oriented at 15 (or less) degree focal offsets to provide overlapped fields of view).

Preferably, each of the imaging cameras 16, 18 is equipped with an interface that provides integral image modification capability, and specifically a sub-sampling feature allowing the faster frame rates at reduced resolution (for example, 21.3 FPS for 1106×1502 pixels or 76.4 FPS for 554×752 pixels, both at 40 MHz).

Frame windowing and sub-sampling are controlled by a serial interface to the cameras 16, 18 from the processing electronics. The camera also provides for an external signal to allow synchronization between cameras.

In the illustrated embodiment, the array of CMOS imagers 16, 18 resident in sensor head 12 is controlled by six (6) separate processing modules in control apparatus 42 in order to handle information flow and image analysis of the multiple outputs of the camera system. The separate processing modules include, for example, four (4) Tracking Zoom Imager (TZI) processors 52 each to handle information flow and image analysis of one bank of six TZI imagers 18 located, for example, in the six lower decks 14B-G of the head 12. The processing modules also include one Full-Field Imager (FFI) processor 54 for managing the four FFI imagers 16 in the top deck 14A, plus one host processor 56 and an optional "automatic target recognition" (ATR) Processor 70 for high-speed, high precision target detection, identification and tracking, etc. All processing modules 52, 54, 56, 70 in control apparatus 42 employ a uniform stacked-board/modular configuration as will be described, and may be PC/104+ CPU Modules.

The FFI processor 54 and host processor 56 are in communication with a display system 60 that includes an interactive graphical user interface (GUI) capable of displaying a full 360-degree field of view and of allowing a user to select regions for higher resolution inspection.

Each of the TZI Processors 52 (four in this embodiment) may comprise an embedded single board computer. For example, PC/104+ CPU Modules are well-suited for this purpose, a variety of which are available from various manufacturers.

Each of the four TZI Processors 52 commands a respective bank of (in this instance) six Tracking Zoom Imagers (TZI) 18 over a serial input/output bus. Thus, each TZI Processor 52 acquires and processes data from a single bank of TZI imagers 18. Specifically, the TZI Processors 52:

Set camera resolution

Control window and zoom tracking

Accept image data via, for example, 4 gigabit Ethernet switches

Route data to the host processor 56 or advanced target recognition (ATR) processor 70.

The FFI Processor 54 may likewise comprise a PC/104+ CPU Module, and it routes 360-degree low resolution image data to the Display System 60. Thus, the FFI Processor 54 acquires and routes data from the upper deck of low-resolution FFI imagers 16 to the display system 60.

The Host Processor 56 may likewise comprise a PC/104+ CPU Module, for example, and it commands and controls all the TZI processors 52 and FFI processor 54. Thus, the Host Processor 56 provides overall command and control to the individual imagers 16, 18 and other processors 52, 54 and routes images to the display system 60. Specifically, the Host Processor 56 will:

send search, target tracking, zoom commands and the TZI Processors 52;
  route target or zoom windows to the Display System 60;
  accept state commands from Display System 60.

The ATR Processor 70 may likewise, for example, comprise a PC/104+ CPU Module, and it performs high-speed, high-precision target detection, identification and tracking, and routes target tracking information to the Host Processor 56. There are a variety of possible ATR approaches and software that may be suitable for this purpose. For example, Vasiliev et al., Real-Time Smart Optical SAR Signal Processor, Proc. SPIE Vol. 3161, p. 193-202, Radar Processing, Technology, and Applications II, disclose signal processing for ATR applications using a coarse ATR processor that performs early detection of small targets to select regions of interest in a large field of view, and a fine ATR processor for accurate classification of selected targets.

Figure 2:
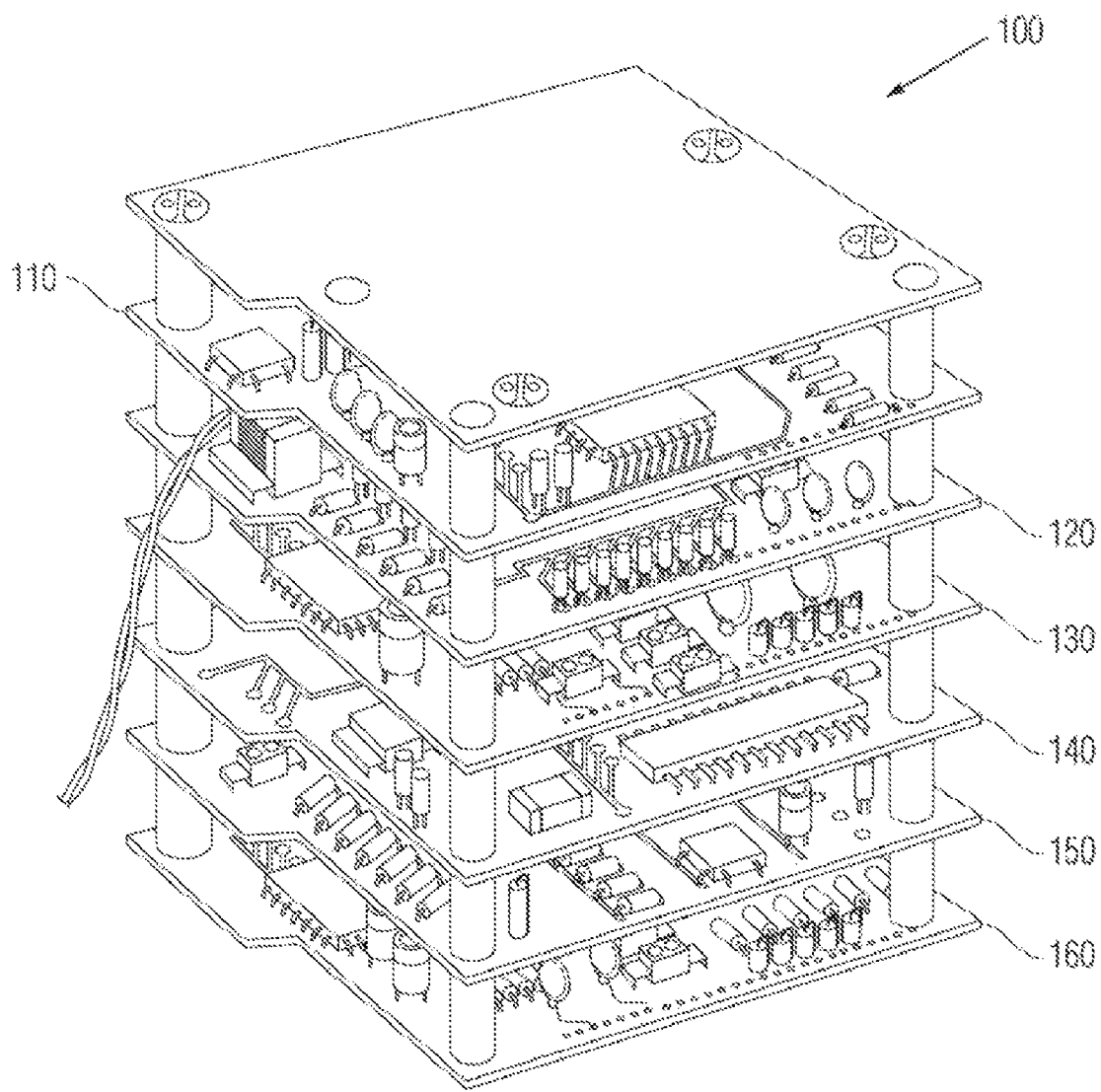
FIG. 2 is a perspective view of an exemplary processing module.

FIG. 2 is a perspective view of an exemplary processing module 100 representative of any one of the imaging processors 52, 54, 56 or 70. Each processor module is preferably arranged in a stacked configuration within a conventional (in this instance) PC104+ chassis with multiple PC boards dedicated to the various functions.

Here, for example, the topmost board 110 is a power supply/regulator. The next board 120 is a CPU board comprising (in this instance) a PC/104+ CPU Module as described above. The I/O board 130 comprises a conventional Ethernet and Serial interface. The frame grabber 140 is a conventional component of computer vision systems designed for digitizing analog video signals. This board will typically comprise a circuit to recover the horizontal and vertical synchronization pulses from the input signal; an analog-to-digital converter; an NTSC/SECAM/PAL color decoder circuit, and some memory for storing the acquired images (e.g., a frame buffer); and a bus interface through which the main processor 56 can control the acquisition and access the data. The A2 board 150 is the primary logic board for the high-speed processor. The digital signal processing (DSP) board 160 is (in this instance) an 800 MHz digital signal processor (DSP). The foregoing boards are stacked and the height of the stack depends on the number of support cards, but the area footprint for each unit is small (approximately 10 cm×12.5 cm). The six PC104+ stacks for all of the processors 52, 54 and 56, plus the stack for the ATR processor 70 are enclosed in a housing of, for example, 40 cm×50 cm×20 cm, which results in a footprint approximately the size of a standard laptop PC.

When PC104+ stacks are used for processors 52, 54, 56 and 70, a single PC104 processor is associated with each stack, for a total of (in this instance) seven processors in the system (four TZI's, one FFI, one Host, and one automatic target recognition (ATR).

The satellite TZI and FFI processors 52, 54 control the high and low-resolution cameras 16, 18 (frame size, window, resolution, etc.), and acquire and process the sensor data. The single host processor 56 handles overall control of the satellite processors, directing them to place their local cameras in the appropriate state and perform the necessary image analysis operations. A video card to support high-speed display features may be used to augment the host processor 56.

The ATR Processor 70 performs high-speed, high-precision target detection, identification and tracking, and routes target tracking information to the Host Processor 56.

All of the above-described image processing and system-level control electronics are preferably configured in multiple PC104+ stacks with processing and integrated I/O and communication capabilities. The various processors 52, 54, 56, 60 and 70 may be connected over a common communication bus and employ Gigabit Ethernet for communication protocol.

Each of the processors 52, 54, 56 and 70 require a real-time embedded operating system for command and control, data acquisition, data handling, image processing and navigation. A presently-preferred operating systems are (in this instance) VxWorks, a Unix-like real-time operating system made and sold by Wind River Systems of Alameda, Calif., USA, and QNX, a Unix-like real-time operating system made and sold by QNX Software Systems of Ottawa, Canada, although one skilled in the art will readily understand that other systems may provide the same capabilities.

Each of the processors 52, 54, 56 and 70 also requires a real-time software package to acquire and process sensor information (platform telemetry, scene interpretation, etc.) and generate the control behaviors for the system.

The display system 60 is preferably a computer workstation with high-resolution CRT or LC, user input controls, and hosting an interactive graphical user interface (GUI) capable of displaying a full 360-degree field of view and for allowing a user to select regions for higher resolution inspection, and allowing user control of the periscope. The GUI displays low-resolution 360-degree imagery and up to 4 high-resolution views from the imagers 16, 18, providing scene displays and passing commands to the Host Processor 56. In addition, the GUI allows the operator to exercise all of the operational states of the system (search, tracking, display, high-resolution windowing, etc.) and provides a means to enable data collection for algorithm development and system evaluation.

Figure 3:
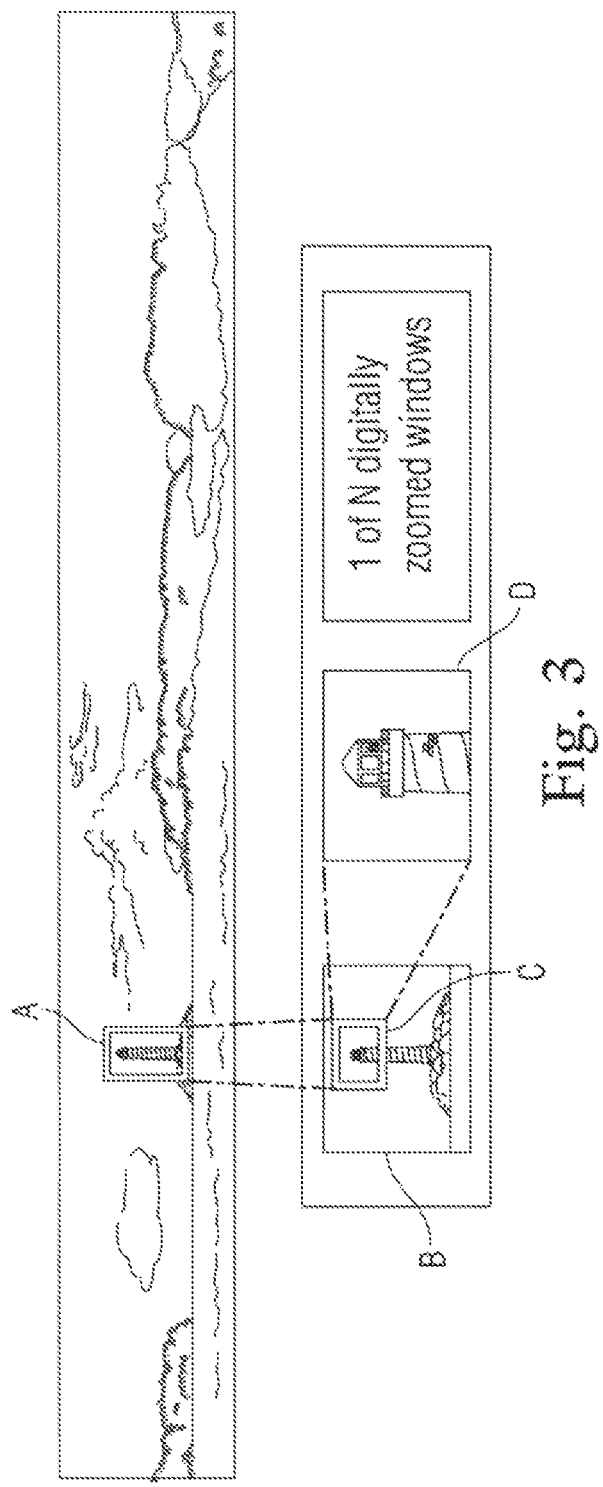
FIG. 3 shows a screen shot of the user interface with a full 360-degree, low-resolution real-time view of the scene across the top, and higher-resolution windows that are user-selected or automatically generated by the continuous ATR background processing of the scene.

FIG. 3 shows a screen shot of the method of operation of the user interface GUI with a full 360-degree, low-resolution real-time view of a scene across the top. In accordance with the present invention a user can select a manually chosen or automatically identified window A for higher-resolution display, which window A then appears as a higher-resolution window B at another position on the display. This process can be repeated with the user selecting another window C for yet-higher-resolution display, which window C then appears as a higher-resolution window D at another position on the display. These windows may be user-selected or automatically generated by the continuous ATR processor 70 background processing of the scene. There may be 1-to-N digitally zoomed windows.

For efficient surveillance and tracking, the present system simultaneously provides both high and low resolution, and wide and narrow FOV images with user-selected ROIs that are spatially and temporally varied.

Figure 4:
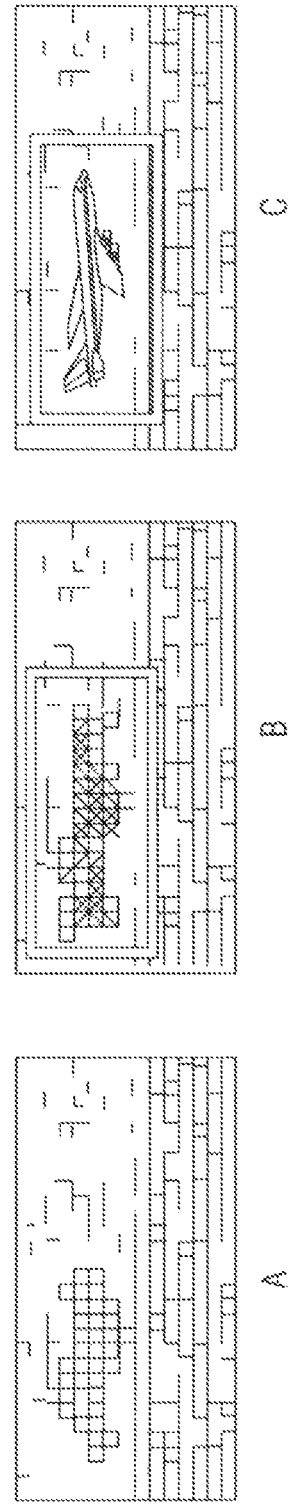
FIG. 4. shows the conceptual processing. The left-most window (A) is a low resolution view of the scene where a blob-like region is a potential target; the middle window (B) is a first level of electronic zoon into the ROI with the target detected and tracked; and the right-most window (C) is a second level of electronic zoon into the ROI with the target classified and tracked.

FIG. 4 shows the target acquisition and tracking processing performed by the ATR Processor 70. The left-most window (A) is a low resolution (highly pixilated) view of the scene where a blob-like region is a potential target; the middle window (B) is a first level of electronic zoom into the ROI with the target detected and tracked; and the right-most window (C) is a second level of electronic zoom into the ROI with the target classified and tracked.

It should now be apparent that the above-described high resolution CMOS imaging system for use in a periscope head excels at providing a seamless continuous 360 degree field-of-view with electronically selectable low and high-resolution fields-of-view, and allows continuous observation of contacts (potential targets), automatic detection and tracking of contacts, recognition of contacts (threat determination), and the ability to digitally zoom to any area for closer inspection.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An imaging array use in a periscope head, comprising a plurality of cylindrical decks stacked end-to-end and including at least one deck having a cylindrical outer wall containing closed internal partitions defining a honeycomb of compartments, and a plurality of wide field-of-view imagers arranged back-to-back in said compartments and directed along offset focal paths, and at least one coaxially adjoining decks having a cylindrical outer wall containing closed internal partitions defining a honeycomb of compartments, and a plurality of narrow-field-of-view imagers directed along offset focal paths, wherein the imagers of adjoining stacked decks are offset from one another.

2. The imaging array use in a periscope head according to claim 1, wherein said wide field of view imagers are CMOS imagers.

3. The imaging array use in a periscope head according to claim 2, wherein said narrow field-of-view imagers are CMOS imagers.

4. The imaging array use in a periscope head according to claim 2, wherein said plurality of wide field-of-view CMOS imagers further comprise four wide field-of-view CMOS imagers 5. The imaging array use in a periscope bead according to claim 4, wherein said four wide field-of-view CMOS imagers further comprise four 92-degree full-field imagers.

6. The imaging array use in a periscope head according to claim 5, wherein said four wide field-of-view CMOS imagers are arranged back-to-back within corresponding compartments in said deck along 90 degree offset focal paths.

7. The imaging array use in a periscope head according to claim 1, wherein said at least one coaxially adjoining decks further comprise at least six adjoining decks.

8. The imaging array use in a periscope head according to claim 1, wherein said plurality of narrow-field-of-view imagers further comprise at least four narrow field of view imagers directed along offset focal paths.

9. A digital imaging system for use in a periscope head, comprising:
a sensor head for scene acquisition, said sensor head including a plurality of wide field-of-view imagers having greater then 90 degree fields of view and arranged with 90 degree offset focal paths arranged along a first plane, and a plurality of narrow field-of-view imagers having greater than 15 degree fields of view and arranged with at least 15 degree offset focal paths arranged along a second plane, said narrow field-of-view imagers being offset from said wide field-of-view imagers.

10. The digital imaging system for use in a periscope head according to claim 9, further comprising a control apparatus inclusive of a wide-field imaging processor module dedicated to said wide field-of-view imagers, at least one narrow-field imaging processor module dedicated to said narrow field-of-view imagers, a host processor, and a display system.

11. The digital imaging system for use in a periscope head according to claim 10, further comprising an automatic target recognition (ATR) processor connected to said host processor.

12. The digital imaging system for use in a periscope head according to claim 10, wherein said sensor head comprises a cylindrical enclosure having a plurality of cylindrical decks, and said wide field-of-view imagers are seated in one deck back-to-back with 90 degree offset focal paths, and said narrow field-of-view imagers are seated in other decks.

13. The digital imaging system for use in a periscope head according to claim 12, wherein said control apparatus includes software for providing an interactive graphical user interface (GUI) that displays a full 360-degree field of view and allows the user to select regions for higher resolution inspection.

* * * * *